United States Patent [19]

Moradi-Araghi et al.

[11] Patent Number: 5,043,364

[45] Date of Patent: Aug. 27, 1991

[54] GELATION OF ACRYLAMIDE-CONTAINING POLYMERS WITH FURFURYL ALCOHOL AND WATER DISPERSIBLE ALDEHYDES

[75] Inventors: Ahmad Moradi-Araghi, Bartlesville, Okla.; G. Allan Stahl, Humble, Tex.

[73] Assignee: Phillips Petroleum Company, Bartlesville, Okla.

[21] Appl. No.: 493,665

[22] Filed: Mar. 15, 1990

[51] Int. Cl.$^5$ ............................................. C09K 7/00
[52] U.S. Cl. ..................................... 523/130; 523/131; 523/132; 524/111; 524/547; 524/555; 525/329.4; 252/8.551; 166/295
[58] Field of Search ................... 523/130, 131, 132; 252/8.551; 524/111, 547, 548, 549, 555; 525/329.4, 385; 166/295

[56] References Cited

U.S. PATENT DOCUMENTS

| | | | |
|---|---|---|---|
| 3,242,020 | 3/1966 | Atkins et al. | 149/19 |
| 3,373,812 | 3/1968 | Smith | 166/25 |
| 4,532,052 | 7/1985 | Weaver et al. | 252/8.55 |
| 4,539,348 | 9/1985 | Gajria et al. | 523/409 |
| 4,542,176 | 9/1985 | Graham | 524/543 |
| 4,939,203 | 7/1990 | Marrocco | 524/557 |

OTHER PUBLICATIONS

Hess, Patrick H., Clark, Co., Haskin, C. A., Hull, T. R., "Chemical Method for Formation Plugging", *Journal of Petroleum Technology*, May 1971, pp. 559–564.

*Primary Examiner*—Paul R. Michl
*Assistant Examiner*—Edward J. Cain
*Attorney, Agent, or Firm*—Hal Brent Woodrow

[57] ABSTRACT

A novel composition and process are disclosed for forming crosslinked gels at elevated temperatures utilize a novel crosslinking agent comprising a furan derivative and a water dispersible aldehyde or aldehyde generating compound.

10 Claims, No Drawings

GELATION OF ACRYLAMIDE-CONTAINING POLYMERS WITH FURFURYL ALCOHOL AND WATER DISPERSIBLE ALDEHYDES

FIELD OF THE INVENTION

The present invention relates to a novel process for crosslinking water-soluble polymers utilizing an organic crosslinking system composed of a furan derivative and a water dispersible aldehyde.

BACKGROUND OF THE INVENTION

It is well known to those skilled in the art that gelled or crosslinked water-soluble polymers are useful in enhanced oil recovery operations. They have been used to alter the permeability of underground formations in order to enhance the effectiveness of water flooding operations. Polymers along with an appropriate crosslinking system are injected in an aqueous solution into the formation. The polymers then permeate into a gel in the regions having the highest water permeability. Any fluids injected into the formation in subsequent water flooding operations, will then be diverted away from the regions in which the gel formed to areas of the formation now having a higher water permeability.

Although this technique is effective in enhancing hydrocarbon production, it does have problems. The primary one being that water-soluble polymers and conventional crosslinking agents gel fairly quickly after being injected into the formation at an elevated temperatures. Quite often only the regions near the well bore are treated, since the polymers and conventional crosslinking agent gel before they have an opportunity to percolate very far into the formation.

It would therefore be a valuable contribution to the art to develop an organic crosslinking system which had a delayed gelation rate to permit greater penetration into the formation of the water-soluble polymer and crosslinking agent before gelation occurs.

Thus, it is an object of the present invention to provide a novel crosslinking system with a delayed gelation rate in high temperature.

It is a further object of the present invention to provide novel gels formed with said novel crosslinking system and water-soluble polymers.

Other aspects and objects of this invention will become apparent here and after as the invention is more fully described in the following summary of the invention and detailed description of the invention, examples, and claims.

SUMMARY OF THE INVENTION

In accordance with the present invention we have discovered that a method of altering the permeability of a porous subterranean formation having an ambient temperature of about 200° F. in fluid communication with a wellbore comprising transmitting into said porous subterranean formation via the fluid communication of said wellbore (a) a water-soluble polymer present in the range of from about 0.1 weight percent to about 5.0 weight percent wherein said water-soluble polymer contains in the range of about 100 mole percent to about 5 mole percent of at least one monomer of the formula:

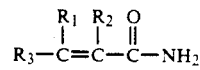

wherein $R_1$, $R_2$, and $R_3$ are selected from the group consisting of hydrogen and alkyl radicals containing from 1 to 3 carbon atoms and from 0 to 95 mole percent of at least one monomer selected from the group consisting of;

(i) a monomer which can be represented by the formula:

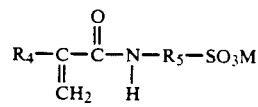

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and arylene radical containing from 6 to 10 carbon atoms, and M is selected from the group consisting of hydrogen, ammonium, potassium, and sodium;

(ii) a monomer represented by the following formula:

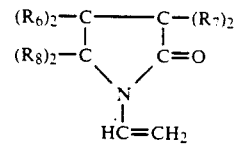

where $R_6$, $R_7$, and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and mixtures of any two or more thereof;

(b) a water dispersible aldehyde or aldehyde generating compound present in the range of about 0.005 to about 5.0 weight percent;

(c) a furan derivative present in the range of from about 0.005 to about 5.0 weight percent of the formula:

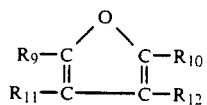

wherein $R_9$, $R_{10}$, $R_{11}$, and $R_{12}$, are selected from the group consisting of hydrogen, methyl, hydroxyl, carbinol, carboxyl, —CH$_2$COOH, acyl amide, mercaptan and primary amine radicals, and at least one $R_9$, $R_{10}$, $R_{11}$, and $R_{12}$ radical must be selected from the group consisting of hydroxyl, carbinol, carboxyl, —$CH_2COOH$, acyl amide, mercaptan and primary amine radicals; and (d) water present in the range of from about 85 to about 99.9 weight percent; and allowing the water-soluble polymer, water dispersible aldehyde or aldehyde generating compound, furan derivative and water to gel in said porous subterranean formation.

In accordance with another embodiment of the present invention we have also discovered a gel composition produced from the gelation of the following components (a) a water-soluble polymer present in the range of from about 0.1 weight percent to about 5.0 weight percent wherein said water-soluble polymer contains in the range of about 100 mole percent to about 5 mole percent of at least one monomer of the formula:

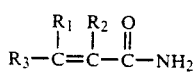

wherein $R_1$, $R_2$, and $R_3$ are selected from the group consisting of hydrogen and alkyl radicals containing from 1 to 3 carbon atoms and from 0 to 95 mole percent of at least one monomer selected from the group consisting of;

(i) a monomer which can be represented by the formula:

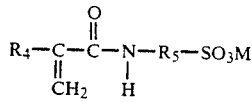

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radicals containing from 6 to 10 carbon atoms, and M is selected from the group consisting of hydrogen, ammonium, potassium, and sodium;

(ii) a monomer represented by the formula:

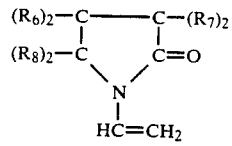

where $R_6$, $R_7$, and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and mixtures of any two or more thereof;

(b) a water dispersible aldehyde present in the range of from about 0.005 to about 5.0 weight percent;

(c) a furan derivative present in the range of from about 0.005 to about 5.0 weight percent of the formula:

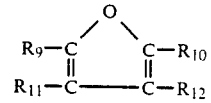

wherein $R_9$, $R_{10}$, $R_{11}$, and $R_{12}$, are selected from the group consisting of hydrogen, methyl, hydroxyl, carbinol, carboxyl, —$CH_2COOH$, acyl amide, mercaptan and primary amine radicals; and at least one $R_9$, $R_{10}$, $R_{11}$, and $R_{13}$ radical must be selected from the group consisting of hydroxyl, carbinol, carboxyl, —$CH_2COOH$, acyl amide, mercaptan and primary amine radicals; and (d) water present in the range of from about 85 to about 99.9 weight percent.

DETAILED DESCRIPTION OF THE INVENTION

The organic crosslinking system of the present invention is formed from:

(a) a furan derivative (b) a water dispersible aldehyde or aldehyde generating compound.

Furan derivatives suitable for use in the present invention are of the formula:

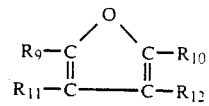

wherein $R_9$, $R_{10}$, $R_{11}$, and $R_{12}$, are selected from the group consisting of hydrogen, methyl, hydroxyl, carbinol, carboxyl, —$CH_2COOH$, acyl amide, mercaptan and primary amine radicals, and at least one $R_9$, $R_{10}$, $R_{11}$ and $R_{12}$ radical must be selected from the group consisting of hydroxyl, carbinol, carboxyl, —$CH_2COOH$, acyl amide, mercaptan and primary amine radicals.

Suitable furan derivatives include but are not limited to those selected from the group consisting of furfuryl acetate, furanamine, furandiamine, furantriamine, furantetramine, furancarbinol, furandicarbinol (furandimethanol), furantricarbinol, furantetracarbinol, hydroxyfuran, dihydroxyfuran, trihydroxyfuran, tetrahydroxyfuran, furancarboxylic acid, furandicarboxylic acid, furantetracarboxylic acid, furanmethylenecarboxylic acid, furanbis(methylenecarboxylic acid), furantris(methylenecarboxylic acid) and furantetrakis(methylenecarboxylic acid), mercaptofuran, and combinations of two or more thereof. The preferred furan derivative for the practice of the present invention is 2-furancarbinol, mercaptofuran, furandicarbinol, furfuryl acetate and furanamine.

Any water dispersible aldehyde or aldehyde generative compound can be utilized in the practice of the present invention. Thus, suitable aldehyde or aldehyde generating compounds can be selected from the group consisting of aliphatic aldehydes, aliphatic dialdehydes, and aromatic aldehydes, aromatic dialdehydes. Preferred aldehydes or aldehyde generating compounds can be selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine and mixtures thereof.

As a general guide, the amount of furan derivative used in preparing the gelled compositions of the invention will be in the range of about 0.005 to about 5.0 wt. %, preferably from in the range of about 0.01 to about 2.0 wt. % and most preferably from in the range of about 0.05 to about 1.0 wt % based on the total weight of the gelable composition. The amount of aldehyde or aldehyde generating compound used will be in the range of about 0.005 to about 5.0 wt. %, preferably in the range of about 0.01 to about 2.0 wt. % and most preferably in the range of about 0.05 to about 1.0 wt % based on the total weight of the gelable composition. The molar ratio of furan derivative to aldehyde or aldehyde generating compound will be in the broad range of about 30:1 to 1:30 with a more preferred range of 2:1 to 1:4.

As used in this application, the term water-soluble polymer, copolymers, and terpolymers refers to those polymers which are truly water-soluble or those which are dispersible in water or other aqueous medium to form a stable colloidal suspension which can be pumped into a formation and gelled therein.

The water-soluble polymers which are suitable for use in the present invention include those which contain from 5 to 100 mole percent of at least one monomer of the formula:

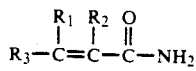

wherein $R_1$, $R_2$, and $R_3$ are selected from the group consisting of hydrogen and alkyl radicals containing from 1 to 3 carbon atoms, of which acrylamide and methacrylamide are the preferred examples; and from 0 to 95 mole percent of at least one monomer selected from the group consisting of;

(a) monomers represented by the formula:

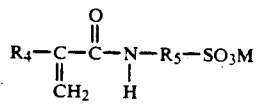

wherein $R_4$ is selected from the group consisting of hydrogen or alkyl radicals containing from 1 to 6 carbon atoms, $R_5$ is selected from the group consisting of alkylene radicals containing from 1 to 6 carbon atoms and arylene radicals containing from 6 to 10 carbon atoms, and M is selected from the group consisting of hydrogen, ammonium, potassium, and sodium, of which 2-acrylamido-2-methylpropane sulfonic acid or sodium 2-acrylamido-2-methylpropane sulfonate are the preferred examples;

(b) monomers represented by the formula:

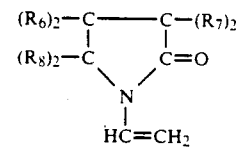

where $R_6$, $R_7$ and $R_8$ are independently selected from the group consisting of hydrogen and alkyl radicals containing from 1 to 2 carbon atoms of which N-vinyl-2-pyrrolidone is the preferred example;

(c) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxy-ethyl)diethylmethylammonium methyl sulfate; and (d) mixtures of any two or more thereof.

The polymerization of any of the above described monomers and the resulting polymers are well known to those skilled in the art. There are numerous references which disclose the methods of polymerizing these monomers, for example see U.S. Pat. No. 4,244,826. The manner in which these monomers are polymerized into water-soluble polymers or the resulting polymers is not critical to the practice to the present invention. The molecular weight of the water-soluble polymers utilized in the present invention is not critical. It is presently preferred, however, that polymers have the molecular weight of at least 100,000 and more preferably about 100,000 to about 20,000,000. The upper limit is not critical as long as the polymer is still water dispersible and can be pumped into the formation.

The presently preferred class of water-soluble polymers are those selected from the group consisting of homopolymers of acrylamide, homopolymers of methacrylamide, copolymers of acrylamide and acrylic acid, copolymers of acrylamide and sodium acrylate, copolymers of acylamide and N-vinyl-2-pyrrolidone, copolymers of acrylamide and sodium 2-acrylamido-2-methylpropane sulfonate, copolymers of acrylamide and 2-acrylamido-2-methylpropane sulfonic acid, terpolymers of acrylamide, N-vinyl-2-pyrrolidone, and sodium 2-acrylamido-2-methylpropane sulfonate and terpolymers of acrylamide, N-vinyl-2-pyrrolidone and 2-acrylamido-2-methylpropane sulfonic acid. The ratio of the monomers in the above-described polymers is not critical; provided however, that at least 5 mole percent of acrylamide is present in the above-described polymers. Particularly preferred are terpolymers of N-vinyl-2-pyrrolidone, acrylamide and sodium 2-acrylamido-2-methylpropane sulfonate wherein said monomers are provided in a 30 to 15 to 55 weight percent terpolymer. Additionally within the scope of this invention is the use of combinations of copolymers and terpolymers utilizing the above listed monomers.

The constituents of the present invention should be present in the following quantities:

|  | Broad Range weight percent | Preferred Range weight percent |
|---|---|---|
| water-soluble polymers | 0.1–5.0 | 0.3–2.0 |
| aldehyde or aldehyde generating compound | 0.005–5.0 | 0.01–2.0 |
| furan derivative | 0.005–5.0 | 0.01–2.0 |
| water | 85–99.89 | 94–99.68 |

The order in which the constituents are mixed is not critical to the practice of the present invention.

The use of gelled polymers to alter the water permeability of underground formations is well known to those skilled in the art. Generally, an aqueous solution containing the polymer and a crosslinking agent is transmitted into the formation from a well in fluid communication with the formation so that the aqueous solution can diffuse into the more water permeable portions of the formation and alter that water permeability by gelling therein.

The present invention can be used in a similar manner. An aqueous solution containing the water-soluble polymer, aldehyde or aldehyde generating compound, and furan derivative is pumped into the formation so that it alters the water permeability of the formation in a similar manner when gelation takes place. The aqueous solution containing the water soluble polymer, aldehyde or aldehyde generating compound and furan derivative can be pumped into the formation in one slug, or alternatively the components may be sequentially injected in a manner to provide an appropriate concentration in the formation. The present invention's advantage lies in the fact that the onset of gelation is delayed allowing the aqueous solution to penetrate further into the formation.

The nature of the underground formation treated is not critical to the practice of the present invention. The organic crosslinkers will gel the water-soluble polymers in fresh water, salt water, or brines, as well as at a temperature range of from 200° F. to 400° F.

The following specific examples are intended to illustrate the advantages of this invention, but are not intended to unduly limit this invention.

EXAMPLE I

The purpose of this example is to demonstrate the delayed gelation of a water-soluble polymer by a furan derivate and an aldehyde. Additionally this example demonstrates the long term stability of a gel formed with a water-soluble polymer, a furan derivative and an aldehyde.

A one percent solution of a terpolymer composed of 30 wt % of N-vinyl-2-pyrrolidone, 15 wt % of acrylamide, and 55 wt % of sodium 2-acrylamido-2-methylpropane sulfonate was prepared in the following manner. 16.3 ml of an inverse emulsion which contained 32.4 wt % of the above-described active terpolymer was mixed with 500 ml of synthetic sea water.

The synthetic water used had the following formula:

| $NaHCO_3$ | 3.68 grams |
|---|---|
| $Na_2SO_4$ | 77.19 grams |
| NaCl | 429.00 grams |
| $CaCl_2.2H_2O$ | 29.58 grams |
| $MgCl_2.6H_2O$ | 193.92 grams |
| distilled $H_2O$ | q.s. to 18 liters |

0.18 ml of furfuryl alcohol was added to 200 ml of the polymer and synthetic sea water mixture described above, to provide a 1000 ppm furfuryl alcohol concentration. Similarly 0.36 ml of furfuryl alcohol was added to 200 ml of the polymer and synthetic sea water mixture to generate a 2000 ppm furfuryl alcohol concentration.

Five 20 ml samples of the solution, containing 1 percent of the terpolymer and 1,000 ppm furfuryl alcohol were placed in five 2.3 cm × 22.5 cm long ampules. Varying amounts of formaldehyde were added to the ampules to provide the formaldehyde concentration shown in Table I and Table IA.

Five 20 ml ampules were prepared in an identical manner utilizing the 2000 ppm furfuryl alcohol solution containing the 1 percent terpolymer with varying quantities of formaldehyde added to the ampules to provide the concentration also shown in Table I and Table IA.

The ten ampules were sealed under nitrogen and then placed upright in compartmented aluminum boxes with relief holes and placed in an oven and heated to 250° F. Periodically, the ampules were removed from the oven and the mechanical strength of the gel was determined behind a protective shield.

The mechanical strength of the gel was determined by placing the ampules horizontally along a graduated scale and measuring the spread of the gel. If the gel is weak it will spread. The mechanical strength is then expressed mathematically as Percent Gel Strength = (AL−TL) × 100/AL where AL equals ampule length, and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0.

The following results were observed from day 5 to day 71 of aging at 250° F. in Synthetic Seawater.

TABLE I

| Furfuryl-Alcohol (ppm) | Formaldehyde (ppm) | Aging Results in Synthetic Seawater at 250° F. PERCENT GEL STRENGTH AFTER AGING FOR DAYS SHOWN BELOW | | | | | | | | | | | |
|---|---|---|---|---|---|---|---|---|---|---|---|---|---|
|  |  | 5.0 | 6.0 | 7.0 | 8.0 | 9.0 | 12.0 | 19.0 | 23.0 | 26.0 | 34.0 | 56.0 | 71.0 |
| 1000 | 500 | NG | NG | NG | PG | PG | 69.8 | 71.1 | 73.3 | 82.2 | 76.9 | 73.3 | 77.8 |
| 1000 | 1000 | " | " | T | " | " | 75.1 | 83.1 | 86.7 | 87.6 | 89.8 | 89.8 | 87.6 |
| 1000 | 1500 | " | " | " | " | " | 74.2 | 84.4 | 85.8 | 91.1 | 90.2 | 91.1 | 87.6 |
| 1000 | 2000 | " | " | NG | T | T | 46.7 | 78.7 | 82.2 | 85.3 | 88.0 | 88.9 | 92.0 |
| 1000 | 2500 | " | " | " | " | " | PG | 78.7 | 82.2 | 84.9 | 87.6 | 94.2 | 91.1 |
| 2000 | 500 | T | T | T | PG | 60.0 | " | 62.7 | 43.6 | 44.4 | 41.3 | 69.3 | 42.2 |
| 2000 | 1000 | " | 78.7 | 86.7 | 85.8 | 86.7 | 94.2 | 94.7 | 95.6 | 93.3 | 91.1 | 91.6 | 93.8 |
| 2000 | 1500 | " | 52.0 | 78.7 | 78.7 | 85.8 | 92.0 | 94.6 | 95.6 | 96.4 | 97.3 | 97.3 | 97.3 |
| 2000 | 2000 | " | PG | PG | 78.7 | 83.1 | 91.1 | 96.9 | 96.9 | 97.3 | 97.3 | 96.0 | 97.8 |

TABLE I-continued

| Furfuryl-Alcohol (ppm) | Formaldehyde (ppm) | Aging Results in Synthetic Seawater at 250° F. PERCENT GEL STRENGTH AFTER AGING FOR DAYS SHOWN BELOW | | | | | | | | | | |
|---|---|---|---|---|---|---|---|---|---|---|---|---|
| | | 5.0 | 6.0 | 7.0 | 8.0 | 9.0 | 12.0 | 19.0 | 23.0 | 26.0 | 34.0 | 56.0 | 71.0 |
| 2000 | 2500 | " | " | " | 74.2 | 78.7 | 89.3 | 95.6 | 97.8 | 98.2 | 98.7 | 97.3 | 100 |

NG = No Gel, T = Thick and PG — Partial Gel.

The following results were observed after from 146 days to 310 of aging at 250° F. in Synthetic Seawater.

TABLE IA

Aging Results in Synthetic Seawater at 250° F.

| Furfuryl-Alcohol (ppm) | Formaldehyde (ppm) | PERCENT GEL STRENGTH AFTER AGING FOR DAYS SHOWN BELOW | | | |
|---|---|---|---|---|---|
| | | 146 | 163 | 253 | 310 |
| 1000 | 500 | 71.1 | 64.0 | 60.9 | 65.3 |
| 1000 | 1000 | 91.1 | 94.7 | 91.1 | 90.2 |
| 1000 | 1500 | 95.6 | 91.1 | 93.3 | 92.0 |
| 1000 | 2000 | 86.7 | 91.1 | 91.1 | 88.9 |
| 1000 | 2500 | 95.6 | 89.3 | 93.3 | 83.6 |
| 2000 | 500 | 35.6 | 36.0 | 30.7 | 28.9 |
| 2000 | 1000 | 92.4 | 94.2 | 88.9 | 79.1 |
| 2000 | 1500 | 96.4 | 96.0 | 87.8 | 96.4 |
| 2000 | 2000 | 100 | 98.2 | 95.1 | 99.1 |
| 2000 | 2500 | 100 | 97.3 | 97.8 | 98.7 |

The results above demonstrate that the combination of a furan derivative and an aldehyde to crosslink a water-soluble polymer provide delayed gelation and long term stability.

EXAMPLE II

The purpose of this example is to demonstrate the delayed gelation of a water-soluble polymer by a furan derivative and an aldehyde. Additionally this example demonstrates the long term stability of a gel formed with a water-soluble polymer, a furan derivative and an aldehyde at high temperatures.

The ampules were prepared in a manner identical to those in Example I except that the aging was conducted at 300° F.

The following results were observed from day 2 to day 19:

TABLE II

| Furfuryl-Alcohol (ppm) | Formaldehyde (ppm) | Aging Results in Synthetic Seawater at 300° F. PERCENT GEL STRENGTH AFTER AGING FOR DAYS SHOWN BELOW | | | | | | | | |
|---|---|---|---|---|---|---|---|---|---|---|
| | | 2.0 | 2.3 | 3.5 | 5.0 | 6.0 | 7.0 | 8.0 | 9.0 | 12.0 | 19.0 |
| 1000 | 500 | T | T | T | T | T | T | T | PG | PG | PG |
| 1000 | 1000 | " | PG | " | 81.3 | 85.8 | 77.8 | 82.7 | 84.9 | 84.9 | 81.3 |
| 1000 | 1500 | " | " | 82.2 | 82.7 | 83.1 | 87.6 | 87.6 | 87.1 | 89.3 | 86.7 |
| 1000 | 2000 | " | " | 77.8 | 83.1 | 88.0 | 88.4 | 87.6 | 85.8 | 87.6 | 94.7 |
| 2000 | 500 | " | " | PG | T | T | T | T | T | PG | PG |
| 2000 | 1000 | 74.2 | 78.7 | 85.8 | 86.7 | 87.6 | 87.6 | 87.6 | 87.6 | 84.0 | 76.0 |
| 2000 | 1500 | 83.1 | 89.8 | 97.8 | 97.8 | 100 | 96.4 | 100 | 100 | 93.3 | 94.2 |
| 2000 | 2000 | 86.2 | 93.8 | 95.6 | 97.8 | 97.8 | 96.0 | 100 | 100 | 97.8 | 96.4 |

T = Thick and PG = Partial Gel.

The following results were observed from day 23 to day 310

TABLE IIA

| Furfuryl-Alcohol (ppm) | Formaldehyde (ppm) | Aging Results in Synthetic Seawater at 300° F. PERCENT GEL STRENGTH AFTER AGING FOR DAYS SHOWN BELOW | | | | | | | | |
|---|---|---|---|---|---|---|---|---|---|---|
| | | 23.0 | 26.0 | 34.0 | 56.0 | 71.0 | 146.0 | 163.0 | 253.0 | 310.0 |
| 1000 | 500 | PG | PG | T | T | T | T | testing terminated | | |
| 1000 | 1000 | 91.1 | 88.0 | 78.8 | 39.6 | 45.8 | 33.3 | testing terminated | | |
| 1000 | 1500 | 88.9 | 85.3 | 86.7 | 79.1 | 80.4 | 46.7 | testing terminated | | |
| 1000 | 2000 | 91.1 | 82.2 | 86.7 | 71.1 | 78.2 | 55.6 | testing terminated | | |
| 2000 | 500 | PG | T | T | T | T | T | testing terminated | | |
| 2000 | 1000 | 91.1 | 77.8 | 91.1 | 76.0 | 79.6 | 52.0 | testing terminated | | |
| 2000 | 1500 | 75.6 | 78.7 | 68.4 | 82.2 | 80.0 | 85.8 | 62.2 | 81.3 | 51.6 |
| 2000 | 2000 | 91.1 | 86.7 | 88.9 | 92.0 | 93.3 | 81.3 | 84.4 | 80.9 | 72.0 |

PG = Partial Gel and T = Thick.

Reasonable variations can be made in view of the following disclosure without departing from the spirit and scope of this invention.

That which is claimed is:

1. A method of altering the permeability of a porous subterranean formation with an ambient temperature above 200° F. in fluid communication with a wellbore comprising transmitting into said porous subterranean formation via the fluid communication of said wellbore to said porous subterranean formation,
   (a) a water-soluble polymer present in the range of from about 0.1 weight percent to about 5.0 weight percent wherein said water-soluble polymer contains in the range of about 100 mole percent to about 5 mole percent of at least one monomer of the formula:

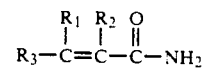

wherein $R_1$, $R_2$, and $R_3$ are selected from the group consisting of hydrogen and alkyl radicals containing from 1 to 3 carbon atoms, and from 0 to 95 mole percent of at least one monomer selected from the group consisting of;
(i) a monomer which can be represented by the following formula:

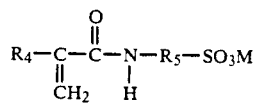

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radicals containing from 6 to 10 carbon atoms, and M is selected from the group consisting of hydrogen, ammonium, potassium, and sodium;
(ii) a monomer represented by the following formula:

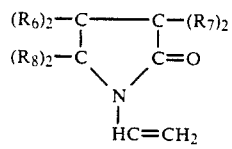

where $R_6$, $R_7$ and $R_8$ are independently selected from the group consisting of hydrogen and alkyl radicals containing from 1 to 2 carbon atoms;
(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)-diethylmethylammonium methyl sulfate; and mixtures of any two or more thereof;
(b) a water dispersible aldehyde or aldehyde generating compound present in the range of about 0.005 to about 5.0 weight percent
(c) a furan derivative present in the range of from about 0.005 to about 5.0 weight percent of the formula:

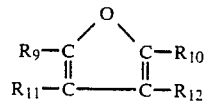

wherein $R_9$, $R_{10}$, $R_{11}$, and $R_{12}$, are selected from the group consisting of hydrogen, methyl, hydroxyl, carbinol, carboxyl, —$CH_2COOH$, acyl amide, mercaptan and primary amine radicals; and at least one $R_9$, $R_{10}$, $R_{11}$, and $R_{12}$, radical must be a hydroxyl, carbinol, carboxyl, —$CH_2COOH$, acyl amide, mercaptan and primary amine radicals; and (d) water present in the range of from about 85 to about 99.89 weight percent; and
allowing the water-soluble polymer, water dispersible aldehyde or aldehyde generating compound, furan derivative and water to form a gel in said porous subterranean formation.

2. The method of claim 1 wherein said water-soluble polymer is selected from the group consisting of homopolymers of acrylamide, homopolymers of methacrylamide, copolymers of acrylamide and acrylic acid, copolymers of acrylamide and sodium acrylate, copolymers of acrylamide and N-vinyl-2-pyrrolidone, copolymers of acrylamide and sodium 2-acrylamido-2-methylpropane sulfonate, copolymers of acrylamide and 2-acrylamido-2-methylpropane sulfonic acid, terpolymers of N-vinyl-2pyrrolidone, acrylamide, and sodium 2-acrylamido-2-methylpropane sulfonate and terpolymers of acrylamide, N-vinyl-2-pyrrolidone and 2-acrylamido-2-methylpropane sulfonic acid;
said furan derivative is selected from the group consisting of furfuryl acetate, furanamine, furandiamine, furantriamine, furantetramine, furancarbinol, furanicarbinol, furantricarbinol, furantetracarbinol, hydroxyfuran, dihydroxyfuran, trihydroxyfuran, tetrahydroxyfuran, furancarboxylic acid, furandicarboxylic acid, furantricarboxylic acid, furantetracarboxylic acid, furanmethylenecarboxylic acid furanbis(methylenecarboxylic acid), furantris(methylenecarboxylic acid), furantetrakis(methylenecarboxylic acid), mercaptofuran and combinations of two or more thereof;
said aldehyde or aldehyde generating compound is selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine or mixtures thereof.

3. The method of claim 1 wherein said water-soluble polymer is present in the range of from 0.3–2 weight percent;
said furan derivative is present in the range of from about 0.01 to about 2.0 weight percent;
said water dispersible aldehyde or aldehyde generating compound is present in the range of from about 0.01 to about 2.0 weight percent;
said water is present in the range of from 94.0–99.68 weight percent.

4. The method of claim 1 wherein said water-soluble polymer is a terpolymer of N-vinyl-2-pyrrolidone, acrylamide, and sodium 2-acrylamido-2-methylpropane sulfonate;
said furan derivative is furfuryl alcohol; and
said aldehyde or aldehyde generating compound is formaldehyde.

5. The method of claim 3 wherein said water-soluble polymer is a terpolymer of N-vinyl-2-pyrrolidone, acrylamide, and sodium 2-acrylamido-2-methylpropane sulfonate;
said furan derivative is furfuryl alcohol; and
said aldehyde or aldehyde generating compound is formaldehyde.

6. A gel composition produced from the gelation of the following components:
(a) a water-soluble polymer present in the range of from about 0.1 weight percent to about 5.0 weight percent wherein said water-soluble polymer contains in the range of about 100 mole percent to about 5 mole percent of at least one monomer of the formula:

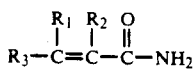

$$R_3-\underset{\underset{R_1}{|}}{C}=\underset{\underset{R_2}{|}}{C}-\overset{O}{\overset{\|}{C}}-NH_2$$

wherein $R_1$, $R_2$, and $R_3$ are selected from the group consisting of hydrogen or alkyl radicals containing from 1 to 3 carbon atoms, and from 0 to 95 mole percent of at least one monomer selected from the group consisting of;

(i) those monomers which can be represented by the following formula:

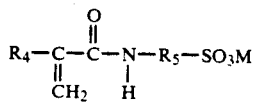

$$R_4-\underset{\underset{CH_2}{\|}}{C}-\overset{O}{\overset{\|}{C}}-\underset{\underset{H}{|}}{N}-R_5-SO_3M$$

wherein $R_3$ is selected from the group consisting of hydrogen or alkyl radicals containing from 1 to 6 carbon atoms, $R_5$ is selected from the group consisting of alkylene radicals containing from 1 to 6 carbon atoms or an arylene radicals containing from 6 to 10 carbon atoms, and M is selected from the group consisting of hydrogen, ammonium, potassium, or sodium, or (ii) a monomer represented by the following formula:

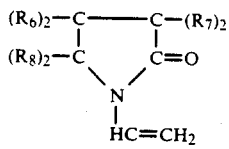

wherein $R_6$, $R_7$, and $R_8$ are independently selected from the group consisting of hydrogen or alkyl radicals containing from 1 to 2 carbon atoms, or (iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)-diethylmethylammonium methyl sulfate; and combinations of any two or more thereof;

(b) a water dispersible aldehyde present in the range of about 0.005 to about 5.0 weight percent;

(c) a furan derivative present in the range of from about 0.005 to about 5.0 weight percent of the formula:

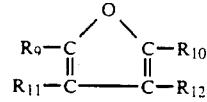

wherein $R_9$, $R_{10}$, $R_{11}$, and $R_{12}$, are hydrogen, methyl, hydroxyl, carbinol, carboxyl, —CH$_2$COOH, acyl amide, mercaptan or primary amine radicals; and at least one $R_9$, $R_{10}$, $R_{11}$, and $R_{12}$, radical must be selected from the group consisting of hydroxyl, carbinol, carboxyl, —CH$_2$COOH, acyl amide, mercaptan or primary amine radicals; and (d) water present in the range of from about 85 to about 99.89 weight percent.

7. The composition of claim 6 wherein said water-soluble polymer is selected from the group consisting of homopolymers of acrylamide, homopolymers of methacrylamide, copolymers of acrylamide and acrylic acid, copolymers of acrylamide and sodium acrylate, copolymers of acrylamide and N-vinyl-2-pyrrolidone, copolymers of acrylamide and sodium 2-acrylamido-2-methylpropane sulfonate, copolymers of acrylamide and acrylamido-2-methylpropane sulfonic acid, terpolymers of N-vinyl-2-pyrrolidone, acrylamide, and sodium 2-acrylamido-2-methylpropane sulfonate and terpolymers of N-vinyl-2-pyrrolidone, acrylamide and 2-acrylamido-2-methyl-propane sulfonic acid;

said furan derivative is selected from the group consisting of furfuryl acetate, furanamine, furandiamine, furantriamine furantetramine, furancarbinol, furandicarbinol furantricarbinol, furantetracarbinol, hydroxyfuran, dihydroxyfuran, trihydroxyfuran, tetrahydroxyfuran, furancarboxylic acid, furandicarboxylic acid, furan tricarboxylic acid, furantetracarboxylic acid, furanmethylenecarboxylic acid, furanbis(methylenecarboxylic acid), furantris(methylenecarboxylic acid), furantetrakis(methylenecarboxylic acid), mercaptofuran and mixtures of two or more thereof; and said aldehyde or aldehyde generating compound is selected from the group consisting of formaldehyde, paraformaldehyde, acetaldehyde, propionaldehyde, butyraldehyde, isobutyraldehyde, valeraldehyde, heptaldehyde, decanal, glyoxal, glutaraldehyde, terephthaldehyde, hexamethylenetetramine and mixtures of two or more thereof.

8. The composition of claim 6 wherein said water-soluble polymer is present in the range of from 0.3–2.0 weight percent;

said furan derivative is present in the range of from about 0.01 to about 2.0 weight percent;

said water dispersible aldehyde is present in the range of from about 0.01 to about 2.0 weight percent;

said water is present in the quantity of from 94.0–99.68 weight percent.

9. The composition of claim 6 wherein said water-soluble polymer is a terpolymer of N-vinyl-2-pyrrolidone, acrylamide, and sodium 2-acrylamido-2-methylpropane sulfonate;

said furan derivative is 2-furancarbinol; and said aldehyde is formaldehyde.

10. The composition of claim 8 wherein said water-soluble polymer is a terpolymer of N-vinyl-2-pyrrolidone, acrylamide, and sodium 2-acrylamido-2-methylpropane sulfonate;

said furan derivative is 2-furancarbinol; and said aldehyde is formaldehyde.

* * * * *